(12) United States Patent
Moffitt

(10) Patent No.: US 10,744,749 B2
(45) Date of Patent: Aug. 18, 2020

(54) BARRIER LAMINATE MATERIAL WITH IMPROVED HEAT SEALABILITY AND REDUCED FLAVOR SCALPING

(71) Applicant: The Coca-Cola Company, Atlanta, GA (US)

(72) Inventor: Ronald D. Moffitt, Spartanburg, SC (US)

(73) Assignee: THE COCA-COLA COMPANY, Atlanta, GA (US)

(*) Notice: Subject to any disclaimer, the term of this patent is extended or adjusted under 35 U.S.C. 154(b) by 199 days.

(21) Appl. No.: 15/766,226

(22) PCT Filed: Oct. 7, 2016

(86) PCT No.: PCT/US2016/056004
§ 371 (c)(1),
(2) Date: Apr. 5, 2018

(87) PCT Pub. No.: WO2017/062778
PCT Pub. Date: Apr. 13, 2017

(65) Prior Publication Data
US 2018/0281365 A1 Oct. 4, 2018

Related U.S. Application Data

(60) Provisional application No. 62/238,369, filed on Oct. 7, 2015.

(51) Int. Cl.
B32B 27/30 (2006.01)
B29C 48/08 (2019.01)
(Continued)

(52) U.S. Cl.
CPC .......... B32B 27/306 (2013.01); B29C 48/022 (2019.02); B29C 48/08 (2019.02);
(Continued)

(58) Field of Classification Search
CPC ....... B32B 27/306; B32B 27/08; B32B 27/18; B32B 27/32; B32B 7/12; B32B 2250/24;
(Continued)

(56) References Cited

U.S. PATENT DOCUMENTS 6,383,582 B1 5/2002 Salste et al.
2003/0059591 A1 3/2003 Penttinen et al.
(Continued)

FOREIGN PATENT DOCUMENTS

JP H06144436 A 5/1994
JP 2000-203635 A 7/2000
(Continued)

OTHER PUBLICATIONS

International Search Report and Written Opinion for PCT/US2016/056004, dated Jan. 11, 2017 (15 pages).
(Continued)

Primary Examiner — Michael C Miggins
(74) Attorney, Agent, or Firm — Eversheds Sutherland (US) LLP

(57) ABSTRACT

This disclosure provides new heat sealable, barrier laminate packaging structures used for beverage component pouches or cartridges, including new structures and chemical compositions of the pouch made to contain the beverage base, component, or component concentrate. These structures and compositions used for heat sealable, barrier laminate packaging balance good heat sealability with improved performance for flavor scalping, oxygen permeability, and/or undesirable moisture ingress or egress, which affect the stability and useful life of the pouch or cartridge and its contents.

18 Claims, 3 Drawing Sheets

(51) Int. Cl.
- *B29C 48/21* (2019.01)
- *B29C 48/00* (2019.01)
- *B32B 27/08* (2006.01)
- *B32B 27/18* (2006.01)
- *B32B 27/32* (2006.01)
- *B32B 7/12* (2006.01)
- B29C 48/18 (2019.01)
- B29K 23/00 (2006.01)
- B29L 31/00 (2006.01)

(52) U.S. Cl.
CPC .............. *B29C 48/21* (2019.02); *B32B 7/12* (2013.01); *B32B 27/08* (2013.01); *B32B 27/18* (2013.01); *B32B 27/32* (2013.01); *B29C 48/18* (2019.02); *B29K 2023/086* (2013.01); *B29L 2031/712* (2013.01); *B32B 2250/05* (2013.01); *B32B 2250/24* (2013.01); *B32B 2307/31* (2013.01); *B32B 2307/7244* (2013.01); *B32B 2307/7246* (2013.01); *B32B 2307/7248* (2013.01); *B32B 2439/40* (2013.01); *B32B 2439/46* (2013.01); *B32B 2439/70* (2013.01)

(58) Field of Classification Search
CPC ........ B32B 2307/31; B32B 2307/7244; B32B 2307/7246; B32B 2439/40; B32B 2439/46; B32B 2250/05; B32B 2307/7248; B32B 2439/70; B29C 48/08; B29C 48/21; B29C 48/022; B29C 48/18; B29K 2023/086; B29L 2031/712

See application file for complete search history.

(56) References Cited

U.S. PATENT DOCUMENTS

| | | |
|---|---|---|
| 2004/0157516 A1 | 8/2004 | Penttinen et al. |
| 2008/0281045 A1 | 11/2008 | Zhang |
| 2009/0258119 A1 | 10/2009 | Nevalainen et al. |
| 2012/0052225 A1 | 3/2012 | Kani et al. |

FOREIGN PATENT DOCUMENTS

| | | |
|---|---|---|
| JP | 2000248124 A | 9/2000 |
| JP | 2011-202147 A | 10/2011 |
| WO | 2003/082568 A1 | 10/2003 |

OTHER PUBLICATIONS

Extended European Search Report of Application No. 16854432.8 dated Apr. 3, 2019.

"Information Offer Form" submitted by third party in Japanese Patent Application No. 2018-517722, Mar. 20, 2019.

BARRIER LAMINATE MATERIAL WITH IMPROVED HEAT SEALABILITY AND REDUCED FLAVOR SCALPING

CROSS REFERENCE TO RELATED APPLICATIONS

This application claims priority to U.S. Provisional Patent Application No. 62/238,369, filed Oct. 7, 2015, which is incorporated by reference herein, and is a 35 U.S.C. § 371 national stage application of PCT Patent Application No. PCT/US2016/056004, filed Oct. 7, 2016, which is incorporated by reference in its entirety.

TECHNICAL FIELD

This disclosure relates generally to container filling systems and methods and more particularly relates to systems and methods for the manufacture, assembly, transport, and filling of the several component used to create a container and the like.

BACKGROUND OF THE INVENTION

Polyethylene terephthalate (PET)-based bottles and containers have been used widely in the beverage industry for packaging carbonated beverages, fruit juices, fruit drinks, and the like. However, many PET- and other polymer-based bottles may suffer from insufficient mechanical and/or thermal properties and poor barrier performance properties, allowing oxygen ingress and/or carbon dioxide loss. Flavor scalping by particularly polymer resins may also limit performance of polymer-based packaging.

Similar performance issues arise for heat sealable pouches or cartridges that contain a beverage base, beverage components or beverage component concentrates, used for dispensing as a mixture with diluents. Like a packaged beverage, the barrier laminate packaging structures used for beverage base or component pouches or cartridges may be subjected to temperature extremes during storage or transportation and may be used in a dispenser without proper refrigeration. These barrier laminate packaging structures can generally comprise various functional layers to enhance package performance. However, the specific chemical composition of the pouch or bag that contains the beverage base, component, or component concentrate can affect flavor scalping, oxygen permeability, and/or undesirable moisture ingress or egress, which affect the stability and useful life of the pouch or cartridge and its contents.

What are needed are improved packaging designs for disposable pouches or cartridges for use in a dispenser that contain beverage bases, components or component concentrates, that can reduce the degradation of the product during storage. Particularly useful improved designs would help reduce the degradation even at elevated temperatures and reduce or minimize flavor scalping, and oxygen and moisture transmission as compared to conventional designs for disposable pouches or cartridges.

SUMMARY OF THE INVENTION

A major function of flexible plastic packaging for food is its protection during the distribution cycle between the vendor and the consumer. However, the plastic layer(s) adjacent to the food, if not properly designed to yield an adequate barrier to flavor sorption, may absorb food flavor components and alter the flavor experience, thereby reducing product quality for the consumer. Moreover, the food contact layer in a flexible plastic package is often required to be heat sealable so the package can be hermetically sealed to protect the food from exposure to oxygen gas, moisture loss, and absorption of environmental contaminants. Heat sealability and low flavor absorption, however, are often opposing considerations when choosing a thermoplastic material to comprise the food contact layer.

For example, semi-crystalline polymers may be employed as food contact layers since the crystalline domains create a barrier to diffusion and uptake of flavor components. However, such crystalline polymers may be difficult to heat seal due restricted chain mobility across the interface of the plied films. This can be especially true of semi-crystalline, hydrogen-bonded barrier polymers such as polyvinyl alcohol and ethylene-vinyl alcohol copolymers.

According to an aspect, this disclosure describes employing a polymer blending approach or strategy, which has been found to distribute and disperse a heat sealable polyolefin-based resin or resin blend, in an ethylene vinyl alcohol (EVA) copolymer. Generally, the ethylene content of the ethylene vinyl alcohol (EVA) co-polymer can be from about 1 mol % to about 90 mol %; alternatively, from about 10 mol % to about 75 mol %; alternatively, from about 20 mol % to about 60 mol %; or alternatively, from about 24 mol % to about 48 mol %. In a further aspect, the heat sealing resin can be blended as a minor component at a volume fraction at or below its level of co-continuity ($\phi_{minor} \leq 0.19$ based upon theory, but the minor phase volume fraction could be as high as 50% or higher) with the primary EVOH matrix.

Moreover, in one aspect, phase stability can be generally safeguarded by the addition of a reactive, interfacial compatibilizing polymer to the ethylene-based minor phase resin prior to blending with the primary EVOH matrix. While not being bound to any theory, it is believed the reactive compatiblizing polymer can diffuse to the polyolefin-EVOH interface and react with the hydroxyl functionality of the EVOH resin, thereby stabilizing the phase structure and providing enhanced interfacial strength development during processing and heat sealing as new interfacial area is generated.

Accordingly, this disclosure provides new heat sealable, barrier laminate packaging structures used for beverage component pouches, bags, or cartridges, including new structures and chemical compositions of the pouch made to contain the beverage base, component, or component concentrate. These structures and compositions used for the barrier laminate packaging can provide improved heat sealability while enhancing performance for flavor scalping, oxygen permeability, and/or undesirable moisture ingress or egress. These properties, in turn, affect the stability and useful life of the pouch or cartridge and its contents.

Generally, barrier laminate packaging structures can comprise various functional layers to enhance and ensure package performance. For example, the outermost layers of the laminate may possess higher peak melting temperatures than the innermost heat sealing layer. Exemplary and somewhat typical embodiments of barrier laminate structures known are illustrated in Table 1.

TABLE 1

Exemplary barrier laminate structures, listed by sequential layer[A]

| Layer | Example 1 | Example 2 |
|---|---|---|
| Outermost | | PET-Ox |
| | PE | Tie |
| | BOPA | BOPA |
| | PE | Tie |
| | Tie | PE |
| | EVOH | PA |
| | Tie | EVOH |
| | Sealant | PA |
| Innermost | | Sealant |

[A]Abbreviations: PET-Ox, inorganic oxide coating on PET (polyethylene terephthalate); PE, polyethylene-based polymer or copolymer; BOPA, a biaxially-oriented polyamide; EVOH, ethylene vinyl alcohol copolymer; PA, a polyamide; tie, an intermediate or "tie" layer, such as anhydride-modified polyolefin(s), that bond dissimilar polymers together, primarily in multilayer, co-extruded structures.

In the exemplary barrier laminate structures of the above table, the PA (polyamide) layers generally impart a limited gas barrier function but provide strength a puncture resistance to the structure. The EVOH (ethylene vinyl alcohol copolymer) layer generally provides a barrier to oxygen gas ingress, and PE (polyethylene-based polymer or copolymer) and PET-Ox (inorganic oxide coating on PET) provide a moisture barrier to the structure, with PET-Ox providing the greatest barrier to moisture ingress or egress. U.S. Pat. No. 7,678,448 to Hachisuka et al. and assigned on its face to Mitsubishi Plastics, Inc. and U.S. Pat. No. 6,902,802 to Kurlan et al. and assigned on its face to E. I. Dupont de Nemours and Company describe various heat sealing resins and non-scalping resins with a low heat sealing initiation temperature.

Despite the range of laminate structures possible and the intended packaging function and performance, all barrier laminate structures possess a sealant layer that is heat sealable to itself in a first closure and to itself and/or a dispensing fitment in a second heat sealing operation after filling to form the finished package. Most heat sealing layers include polyolefin-based polymers and copolymers. Typical examples of polyolefin-based polymers and copolymers include Ziegler-Natta or metallocene-catalyzed polyethylene homopolymers, and alpha-olefin copolymers, ethylene-propylene copolymers, ethylene-acrylic acid and ethylene-methacrylic acid copolymers, and partially neutralized variants thereof.

Examples of sealant polymers for barrier laminate structures are provided in U.S. Pat. No. 7,678,448. Many of these polyolefin-based sealant layers, while being easily heat sealable at low heat seal initiation temperatures and having high heat seal strengths, can be prone to significant uptake of the flavor components in the packaged product. This undesirable uptake of the flavor components in the packaged product is referred to herein as "flavor scalping." The tendency for various flavor components to diffuse into and partition within the sealant polymer matrix leaves the package product deplete of original flavor quality, aroma and taste profiles.

Accordingly, in one aspect, the present disclosure addresses this issue by the use of a polar barrier polymers specially formulated to provide the requisite resistance to flavor scalping while at the same time providing excellent heat sealability. Contrary to conventional sealant layers, the sealant layer according to this disclosure can be, can comprise, or can be selected from a polar barrier polymer such as a specially formulated EVOH, to afford these functions.

Generally, EVOH copolymers are not known for their heat sealing performance due to their high crystallinity and high peak melting temperatures. This disclosure describes the unexpected success in designing specially tailored EVOH copolymers and formulations of specific "balanced" polymer blends to provide the enhanced performance. That is, the particular balanced polymer blends ensure both adequate heat sealing and improved flavor scalping performance.

Therefore, according to an aspect, this disclosure provides new heat sealable, barrier laminate packaging structures used for beverage component pouches or cartridges, including new structures and chemical compositions of the pouch made to contain the beverage base, component, or component concentrate. The various balanced polymer blends, pouches and cartridges, and methods set out in this disclosure can be applied generally and broadly to barrier laminate structures, regardless of their construction. That is, the disclosed polymer blends, pouches and cartridges offer a direct "drop-in" technology for mitigating flavor scalping, without sacrificing the heat sealability of the laminate structure.

In one aspect, this disclosure provides a laminate packaging structure for beverage component pouches, the structure comprising:

a) an innermost heat sealing layer comprising at least one of:
   an EVOH (ethylene vinyl alcohol) copolymer having an ethylene content of from about 1 mol % to about 90 mol %; and/or
   an EVOH copolymer and PE (polyethylene) blend in which the total ethylene content in the blend is from about 1 mol % to about 90 mol %;

Typically, the laminate packaging structure for beverage component pouches can further comprise:

b) optionally, at least one polymer barrier layer compatible with and adjacent the innermost heat sealing layer; and c) an outermost polymer layer compatible with and adjacent the at least one optional barrier layer when present, or compatible with and adjacent the innermost heat sealing layer when the at least one optional barrier layer is absent. In this and other aspects, the ethylene content of the ethylene vinyl alcohol (EVOH) co-polymer can be from about 1 mol % to about 90 mol %; alternatively, from about 10 mol % to about 75 mol %; alternatively, from about 20 mol % to about 60 mol %; or alternatively, from about 24 mol % to about 48 mol %.

Generally, the EVOH and ethylene-based homopolymer or copolymer blend can include a hydroxyl-reactive compatibilizing agent that can connect the EVOH phase with the ethylene copolymer blend-based phase across the interface. Examples of compatibilizing agents include but are not limited to anhydride-grafted variants of the polyethylene, an epoxy-modified (glycidyl) resin capable of reactively engaging EVOH hydroxyl functionality (e.g. glycidyl methacrylate-modified resins), and/or any resin with a reactive functionality capable of reaction with hydroxyl functionality.

In a further aspect, this disclosure also describes a method of reducing flavor scalping in a barrier laminate packaging structure for beverage component pouches, the method comprising:

a) providing a beverage component pouch having an innermost heat sealing layer comprising at least one of:
   an EVOH (ethylene vinyl alcohol) copolymer having an ethylene content of from about 1 mol % to about 90 mol %; and/or
   an EVOH copolymer and PE (polyethylene) blend in which the total ethylene content in the blend of from about 1 mol % to about 90 mol %; and b) storing a beverage component in the beverage component pouch for a period of time.

In addition, this method of reducing flavor scalping can involve co-extruded a laminate packaging structure used for the beverage pouch, comprising the innermost heat sealing layer as described immediately above, and further comprising:

at least one optional polymer barrier layer compatible with and adjacent the innermost heat sealing layer; and/or an outermost polymer layer compatible with and adjacent the at least one optional barrier layer when present, or compatible with and adjacent the innermost heat sealing layer when the at least one optional barrier layer is absent.

Therefore, additional aspects of this disclosure provide a method for producing a heat-sealable laminate packaging structure film, comprising the step of co-extruding:

a) an innermost heat sealing layer comprising at least one of:
an EVOH (ethylene vinyl alcohol) copolymer having an ethylene content of from about 1 mol % to about 90 mol %; and/or
an EVOH copolymer and PE (polyethylene) blend in which the total ethylene content in the blend is from about 1 mol % to about 90 mol %;

b) optionally, at least one polymer barrier layer compatible with and adjacent the innermost heat sealing layer; and c) an outermost polymer layer compatible with and adjacent the at least one optional barrier layer when present, or compatible with and adjacent the innermost heat sealing layer when the at least one optional barrier layer is absent.

These relatively straightforward multilayer packaging films, pouches, and methods are used to provide good barrier properties to a wide range of flavor molecules that is commonly found in beverage component mixtures. Multilayers afford some limits in flavor scalping of molecules that may have varying solubilities and diffusion rates in the first few inner layers of the packaging. For example, certain flavor molecules may be retained by the low solubility in the first (innermost) layer, while other molecules may be soluble in the first (innermost) layer, but not in the second layer.

Thus, this disclosure envisions that the EVOH and ethylene-based homopolymer or copolymer blend with the hydroxyl-reactive compatibilizing agent can connect the EVOH phase with the ethylene copolymer blend-based phase across the interface. While not being bound theory, this generally can achieve the a two-fold purpose: (1) to strengthen the interface so that the blended layer is pervasively integrated and strong; and (2) to provide heat sealable ethylene-copolymer domains at the film surface which can self-interdiffuse to yield improved heat seal strengths, above and beyond that which would be attainable with EVOH alone as a heat sealing layer. Accordingly, this aspect describes why a reactive compatibilizing polymer is generally added to the ethylene-based homopolymer or copolymer blended layer only. If the reactive polymer were to be added to the EVOH layer, its presence would excessively crosslink the EVOH and render the layer non-heat sealable. Therefore, if the reactive compatibilizing polymer is added to the non-reactive blended ethylene-based homopolymer(s) and/or copolymer(s), the phase is entangled but not crosslinked. It is thought that the interface can become covalently linked when the reactive compatiblizing polymer diffuses to the EVOH interface and reacts with the hydroxyl functionality of EVOH.

These and other aspects, features, and embodiments of the present disclosure will be understood by reference to the figure, claims, and detailed disclosure provided herein.

BRIEF DESCRIPTION OF THE DRAWINGS

Various aspects and embodiments of this disclosure are illustrated in the drawing provided herein, as follows.

Figure 1:
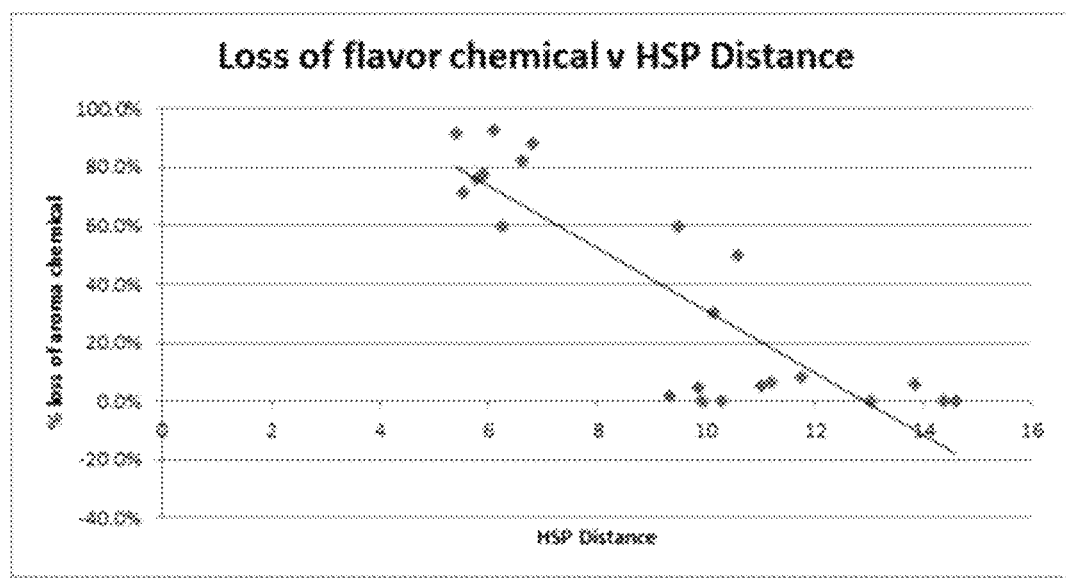
FIG. 1 presents a plot of estimated HSP (Hansen Solubility Parameter) Distance (x-axis) versus the percent (%) loss of specific aroma chemicals (y-axis), for number of flavor molecules and polyolefins. (This plot is adapted from the "The Official Hansen Solubility Parameter Site" at http://hansen-solubility.com/).

$$T_g = \frac{(W_1 T_{g1} + W_2 T_{g2})}{(W_1 + k W_2)} + p W_1 W_2. \qquad (1)$$

DETAILED DESCRIPTION OF THE INVENTION

Among other things, this disclosure provides new compositions, packaging structures, and methods related to heat sealable, barrier laminate packaging that are particularly useful for beverage component pouches, bags, or cartridges. New structures and chemical compositions of the pouch made to contain the beverage base, component, or component concentrate are provided, which can provide improved heat sealability while enhancing performance for flavor scalping, oxygen permeability, and/or undesirable moisture ingress or egress. These properties, in turn, affect the stability and useful life of the pouch or cartridge and its contents.

In an aspect, many or most beverage flavor components have molecular weights ranging from about 100 g/mol to about 250 g/mol. Useful flavor components and molecules include a wide range of chemical functional moieties, varying polarities, and chemical and physical properties. Many flavor components for carbonated soft drinks are citrus-based. For example, a list of selected beverage flavor components are provided in Table 2 for orange juice, which illustrates the relationship between flavor component molecular weight and molecular size, tabulated as molar volume in the table. A comprehensive analysis of citrus aroma/flavor compounds is given in Hognadottir et al., "Identification of Aroma Active Compounds in Orange Essence Oil Using Gas Chromatography-Olfactory and Gas Chromatography-Mass Spectrometry", *J. Chrom. A*, 998 (2003) 201-211.

As Table 2 illustrates, the relatively narrow range of molecular weights and kinetic diameters, which are dependent upon molar volume, for typical flavor components indicate that the rate of diffusion within the polymer and the extent to which uptake (solubility) with the polymer occurs

TABLE 2

Exemplary flavor components and relative abundance for orange juice

| Volatile Compound | Relative Abundance | Chemical Structure | Chemical Formula | Formula Weight | Density ($g/cm^3$) | Molar volume ($cm^3/mol$) | Normal Boiling Point (° C.) | Heat of Vaporization (cal/mol) | Hildebrand Solubility Parameter $(cal/cm^3)^{1/2}$ |
|---|---|---|---|---|---|---|---|---|---|
| limonene | 94.58% | | $C_{10}H_{16}$ | 136.24 | 0.8411 | 162.0 | 176 | 9,366 | 7.23 |
| B-pinene | 1.46% | | $C_{10}H_{16}$ | 136.23 | 0.872 | 156.2 | 164 | 9,115 | 7.27 |
| linalool | 1.05% | | $C_{10}H_{18}O$ | 154.25 | 0.8585 | 179.7 | 198 | 9,824 | 7.03 |
| valencene | 0.65% | | $C_{15}H_{24}$ | 204.35 | 0.894 | 228.6 | 271 | 11,336 | 6.70 |
| a-terpineol | 0.42% | | $C_{10}H_{18}O$ | 154.25 | 0.9338 | 165.2 | 219 | 10,262 | 7.5 |
| decanal | 0.38% | | $C_{10}H_{20}O$ | 156.20 | 0.83 | 188.2 | 207 | 10,012 | 6.94 |
| 1-terpinen-4-ol | 0.24% | | $C_{10}H_{18}O$ | 154.25 | 0.929 | 166.0 | 212 | 10,116 | 7.42 |
| p-cymene | — | | $C_{10}H_{14}$ | 134.21 | 0.857 | 156.6 | 177 | 9,386 | 7.36 |
| eugenol | — | | $C_{10}H_{12}O_2$ | 164.20 | 1.06 | 154.9 | 254 | 10,992 | 8.01 | is due in large part to the extent (thickness) and molecular structure and composition of the sealant resin. This disclosure provides for new compositions and methods for their use in fabricating beverage component pouches and the like.

Solubility parameter-based approaches such as the Hildebrand Solubility Parameter methodology can be employed to describe or characterize the sealant polymer-flavor component interaction, or the interaction between any two molecules or substances for which Hildebrand Solubility Parameters can be determined. In these approaches, the relative ranking of how specific molecular forces of interaction (dispersion (D), polar (P), and hydrogen bonding (H)) between the sealant polymer and a given flavor component interact can be used to predict flavor scalping performance of this particular sealant layer-flavor component combination.

For example, solubility parameters such as the Hildebrand solubility parameter $\delta$ are expressed as the square root of the cohesive energy density of a substance, which is the molar heat of vaporization of a substance E divided by its molar volume V according to the following relationship (Eq. 2):

$$\delta = \sqrt{\frac{E}{V}}. \quad (2)$$

The units of the solubility parameter are (energy/volume)$^{1/2}$. Because the units of energy density are equivalent with those of pressure, one usually encounters solubility parameters expresses in units of (pressure)$^{1/2}$, such as MPa$^{1/2}$.

Likewise, the Hansen Solubility parameters are expressed in identical units. The Hansen Solubility Parameter (HSP) approach assumes the total cohesive energy of the material is equal to the heat of vaporization. Furthermore, the heat of vaporization is divided into contributions from atomic dispersion forces $\delta_D$, permanent dipole forces $\delta_P$, and hydrogen bonding forces $\delta_H$. These contributions are summed as independent vectors to yield the overall Hansen Solubility Parameter:

$$\delta_{HSP}^2 = \delta_D^2 + \delta_P^2 + \delta_H^2 \quad (3).$$

The solubility parameter approach provides a quantitative method of assessing the "likeness" between substances when the differences between the squares of the respective solubility parameters are considered. For example, HSP theory provides the solubility parameter "distance" $R_a$. For example, the "distance" ($R_a$) between Hansen parameters for any combination of two molecules, such as a polymer and flavor molecule, is calculated as follows. As illustrated above, each molecule or polymer has three Hansen parameters, each having the units (MPa$^{1/2}$), as follows:

$\delta_D$ (MPa$^{1/2}$) is the energy from dispersion forces between molecules;

$\delta_P$ (MPa$^{1/2}$) is the energy from dipolar intermolecular force between molecules; and $\delta_H$ (MPa$^{1/2}$) is the energy from hydrogen bonds between molecules.

There is also a calculated value for $\delta_T$ (MPa$^{1/2}$) which corresponds to the total energy. Using these Hansen parameters, the "distance" ($R_a$) (also in MPa$^{1/2}$) between Hansen parameters for any combination of two molecules, such as a polymer and flavor molecule, is calculated according to the following equations. In these equations, the $\delta$ parameters are indicated for molecule 1 and molecule 2.

$$(R_a)^2 = 4(\delta_{D,2} - \delta_{D,1})^2 + (\delta_{P,2} - \delta_{P,1})^2 + (\delta_{H,2} - \delta_{H,1})^2 \quad (4)$$

$$R_a = \sqrt{4(\delta_{D,2}^2 - \delta_{D,1}^2) + (\delta_{P,2}^2 - \delta_{P,1}^2) + (\delta_{H,2}^2 - \delta_{H,1}^2)} \quad (5)$$

The closer the "distance" between any pair of molecules or substances, that is, the smaller the value of $R_a$, the more soluble one is in the other, pointing to a generally undesirable combination of sealant layer polymer and flavor molecule.

In these equations (Eq. 4 and Eq. 5), the factor of 4 leading the first term in the radical is an empirical addition to the equations to achieve a better data fit. The HSP distance $R_a$ yields a relative assessment of the molecular compatibility between two substances related to the total relative contributions of their molecular interactions. The distance $R_a$ has increased significance when compared to the experimentally determined solubility sphere radius $R_0$ of a substance. According to HSP theory, miscibility is indicated when the ratio $R_a/R_0 < 1$, this ratio being referred to as the RED Number in HSP analysis.

Table 3 in this disclosure demonstrates an HSP analysis for flavor scalping using the HSP approach to provide a ranking of potential sealant layer compositions, in terms of their projected flavor scalping performance. For this analysis, five flavor marker compounds were examined, specifically: d-limonene, eugenol, octanal, nonanal, and decanal. These five flavor molecules were used to assess the HSP screening distance ($R_a$) for particular sealant polymer-flavor compound combinations.

TABLE 3

Five flavor marker molecules used to assess HSP screening distance ($R_a$) for particular sealant polymer-flavor compound combinations.

| Flavor Marker Compound | | d-limonene | eugenol | octanal | nonanal | decanal |
|---|---|---|---|---|---|---|
| $\delta_D$ (MPa$^{1/2}$) | | 17.20 | 19.00 | 16.10 | 16.20 | 16.30 |
| $\delta_P$ (MPa$^{1/2}$) | | 1.80 | 7.50 | 5.80 | 5.28 | 4.80 |
| $\delta_H$ (MPa$^{1/2}$) | | 4.30 | 13.00 | 4.70 | 4.50 | 4.30 |
| $\delta_T$ (MPa$^{1/2}$) | | 17.82 | 24.21 | 17.75 | 17.62 | 17.53 |
| $R_a$ (MPa$^{1/2}$) | d-limonene | 0.000 | 10.56 | 4.17 | 3.63 | 3.13 |
| | eugenol | 10.56 | 0.00 | 8.95 | 9.22 | 9.50 |
| | octanal | 4.17 | 8.95 | 0.00 | 0.57 | 1.10 |
| | nonanal | 3.63 | 9.22 | 0.57 | 0.00 | 0.53 |
| | decanal | 3.13 | 9.50 | 1.10 | 0.53 | 0.00 |

Referring to Table 3, the first five rows summarize the component and total Hansen Solubility Parameters for five selected flavor marker compounds common to many commercial flavored beverage products. The second five rows reveal the HSP distances between these five flavor marker compounds. The data show that the maximum distance among the five compounds occurs between d-limonene and eugenol, illustrated below.

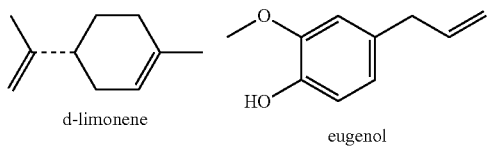

Thus, the Table 3 data suggest that the maximum HSP distance pair is d-limonene and eugenol ($R_a$=10.56), whereas the minimum HSP distance pair is nonanal and decanal ($R_a$=0.53).

This data can be explained by the realization that d-limonene interacts most strongly through dispersive interactions, whereas eugenol, an aromatic alcohol extracted from clove oil, exhibits strong dispersion, polar and especially hydrogen bonding interactions relative to the other four selected flavor marker compounds. Their respective molecular structures, as shown, illustrate how molecular structure, structural symmetry, and chemical functionality contribute to differences in Hansen Solubility Parameters. Similarly, the minimum HSP distance pair of nonanal and decanal can be explained by the realization that octanal, nonanal, and decanal represent a series of C8 through C10 homologs alkyl aldehydes with each successive aldehyde in the sequence differing by only a single methylene unit.

The Table 3 data further illustrates the difficulty in selecting a single polymer food contact layer to mitigate scalping for all flavor compounds. For example, polymers having large HSP distances from non-polar compounds like d-limonene may limit uptake of d-limonene, but they may not be shifted substantially far enough away from mid-range polar compounds such the aldehydes or from flavor compounds that engage in hydrogen bonding interactions. However, if the polymer can be designed or selected so as to maximize the distances along the three molecular interaction axes, that is, along each of the dispersion, polar, and hydrogen bonding axes, the value of the polymer HSP may be shifted far enough away from the flavor component with the largest HSP value that flavor scalping can be effectively minimized. This concept is illustrated, for example, in FIG. 1, and in the calculations comprising Table 4, wherein the screening distance is taken to be 6.25 $MPa^{1/2}$ for a flavor component loss of 75%, based upon the FIG. 1 data.

The flavor marker molecules used to assess HSP screening distance (Ra) for particular sealant polymer-flavor compound combinations were examined using the HSP parameters for the particular sealant polymers illustrated in Table 4. Thus, Table 4 provides the HSP analysis provided for a screening distance of 6.25 $MPa^{1/2}$ and Aroma Compound Loss of 75.0% (see FIG. 1).

Based on this analysis, it was revealed that highly polar polymers such as PVOH (Poly(vinyl alcohol)), PVP (polyvinylpyrrolidone), and cellophane were significantly polar to the extent that the calculated HSP distance exceeded the threshold deemed useful for minimal flavor scalping. Polyvinylpyrrolidone (PVP, also name 1-ethenylpyrrolidin-2-one) and cellophane are substantially water-soluble and may swell in the presence of water to such an extent that their use would severely compromise the seal strength in an aqueous beverage component packaging application. However, an EVOH (ethylene vinyl alcohol) copolymer will exhibit heat sealing and flavor scalping behavior intermediate between that of PVOH and low density polyethylene (LDPE). The EVOH is formed by hydrolyzing a free-radical polymerized ethylene-vinyl acetate copolymer with similar chain architecture to a LDPE.

Figure 2:
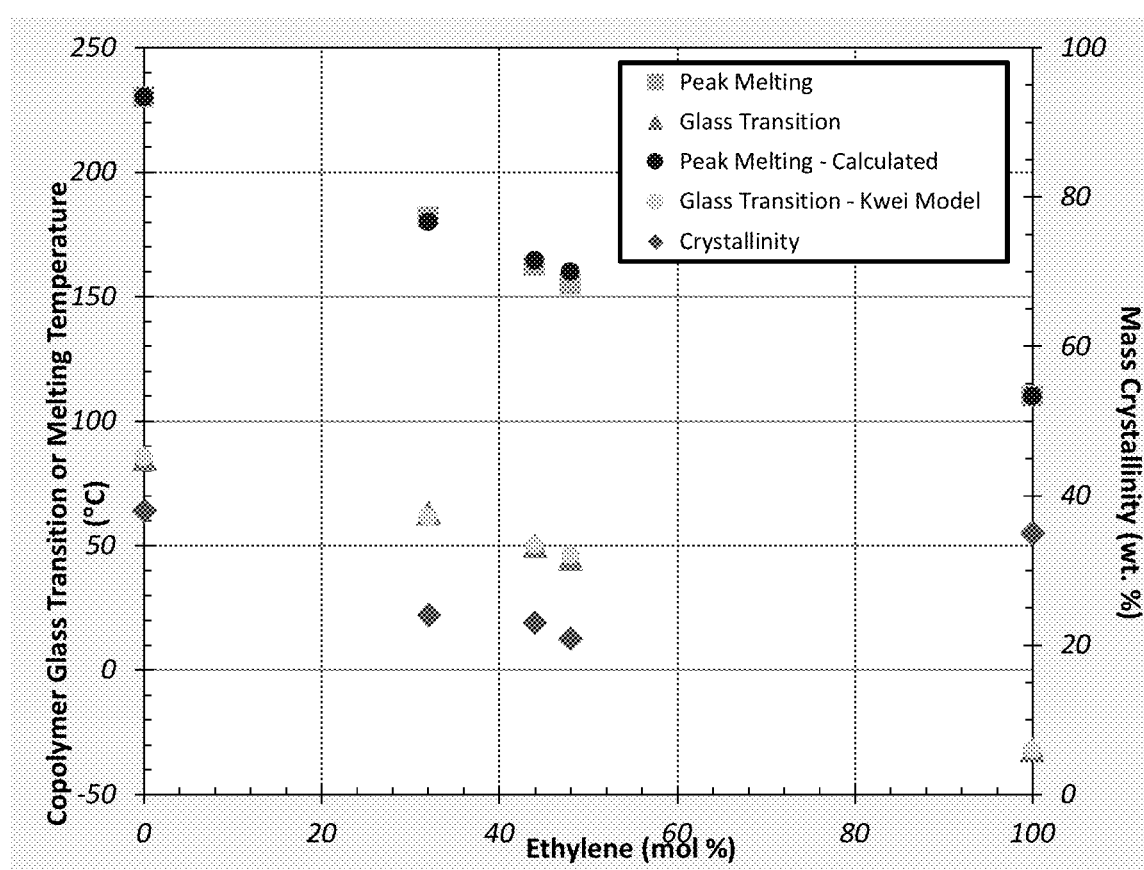
FIG. 2 provides a graphical comparison of various thermal and crystallinity properties for PVOH (poly(vinyl alcohol)) at 0 mol % ethylene content, LDPE (low density polyethylene) at 100 mol % ethylene content, and selected EVOH (ethylene vinyl alcohol) copolymers, in accordance with certain embodiments of this disclosure. Plotted are the glass transition temperatures, peak melting temperatures, and mass-based crystallinity for PVOH, selected EVOH copolymers and LDPE. This analysis provides the balanced sealant heat sealing performance and the flavor scalping performance generally within the range of 40%≤mol % ethylene≤80%, although this approach is applicable to ethylene mole percentages from 1 mol %.
Figure 3:
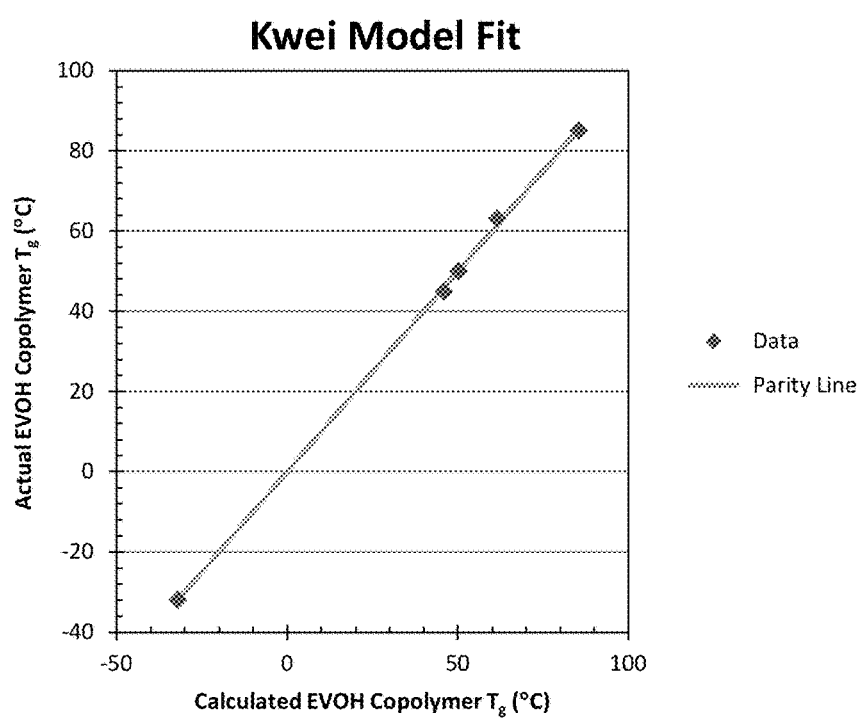
FIG. 3 compares the Kwei model fit of the subject EVOH co-polymer Tg according to this disclosure, by plotting the calculated EVOH copolymer Tg (° C.) versus the actual EVOH copolymer Tg (° C.), based on the Kwei Model Parameters of k, 0.999 and p, 17.58. The calculated EVOH copolymer Tg, Kwei (° C.) is obtained according to the following equation.

Commercial EVOH copolymers are typically specified according to their molar ethylene content, that is, the mole percentage (mol %) of ethylene in the co-polymer. Table 5 provides certain EVOH polymer thermal data, which compared PVOH, EVOH and LDPE properties in order to identify the composition range capable of providing good heat sealing performance with low flavor scalping. FIG. 2 also provides a graphical comparison of the Table 5 data, showing various thermal and crystallinity properties for PVOH (poly(vinyl alcohol)) at 0 mol % ethylene content, LDPE (low density polyethylene) at 100 mol % ethylene content, and selected EVOH (ethylene vinyl alcohol) copolymers with varying amounts of ethylene content, in accordance with certain aspects of this disclosure. Plotted are the glass transition temperatures, peak melting temperatures, and mass-based crystallinity for PVOH, selected EVOH copolymers and LDPE.

TABLE 4

HSP Analysis provided for a screening distance of 6.25 $MPa^{1/2}$ and Aroma Compound Loss of 75.0%.

| Polymer | $\delta_D$ ($MPa^{1/2}$) | $\delta_P$ ($MPa^{1/2}$) | $\delta_H$ ($MPa^{1/2}$) | $\delta_T$ ($MPa^{1/2}$) | HSP Distance, $R_a$ ($MPa^{1/2}$) | | |
|---|---|---|---|---|---|---|---|
| | | | | | d-limonene | Eugenol | Octanal |
| Poly(ethylene terephthalate) (PET) | 18.20 | 6.40 | 6.60 | 20.39 | 5.52 | 6.69 | 4.65 |
| Poly(ethylene furandicaboxylate) (PEF) | 17.00 | 5.00 | 5.00 | 18.41 | 3.30 | 9.29 | 1.99 |
| Poly(lactic acid) (PLA) | 18.60 | 9.90 | 6.00 | 21.91 | 8.74 | 7.44 | 6.60 |
| Cyclic Olefin Copolymer (COC) | 18.00 | 3.00 | 2.00 | 18.36 | 3.05 | 12.05 | 5.44 |
| Polystyrene | 18.50 | 4.50 | 2.90 | 19.26 | 4.00 | 10.58 | 5.29 |
| Polypropylene | 18.00 | 0.00 | 1.00 | 18.03 | 4.09 | 14.29 | 7.86 |
| Polyethylene | 16.90 | 0.80 | 2.80 | 17.15 | 1.90 | 12.91 | 5.58 |
| Polyamide-6,6 | 17.40 | 9.90 | 14.60 | 24.78 | 13.11 | 4.31 | 11.03 |
| Polyvinylbutyral | 18.60 | 4.40 | 13.00 | 23.12 | 9.50 | 3.20 | 9.79 |
| Polyvinylpyrrolidone | 21.4 | 11.6 | 21.6 | 32.54 | 21.58 | 10.67 | 20.78 |

TABLE 4-continued

HSP Analysis provided for a screening distance of 6.25 MPa$^{1/2}$ and Aroma Compound Loss of 75.0%.

| | | | | | | | |
|---|---|---|---|---|---|---|---|
| PVOH | 17.7 | 11.4 | 20.5 | 29.39 | 18.86 | 8.84 | 17.07 |
| Polyglycolic Acid | 18.00 | 8.90 | 7.90 | 21.58 | 8.12 | 5.65 | 5.86 |
| Poly(ethylene acrylic acid) | 17.80 | 7.50 | 12.70 | 23.12 | 10.22 | 2.42 | 8.86 |
| Poly(methacrylic acid) | 17.20 | 3.50 | 11.00 | 20.71 | 6.91 | 5.74 | 7.06 |
| Cellophane | 18.90 | 15.10 | 30.70 | 39.09 | 29.76 | 19.26 | 28.18 |

| | HSP Distance, $R_a$ (MPa$^{1/2}$) | | (HSP Distance - Screening Distance) (MPa$^{1/2}$) | | | | |
|---|---|---|---|---|---|---|---|
| Polymer | Nonanal | Decanal | d-limonene | Eugenol | Octanal | Nonanal | Decanal |
| Poly(ethylene terephthalate) (PET) | 4.65 | 4.72 | −0.73 | 0.44 | −1.60 | −1.60 | −1.53 |
| Poly(ethylene furandicaboxylate) (PEF) | 1.70 | 1.58 | −2.95 | 3.04 | −4.26 | −4.55 | −4.67 |
| Poly(lactic acid) (PLA) | 6.83 | 7.08 | 2.49 | 1.19 | 0.35 | 0.58 | 0.83 |
| Cyclic Olefin Copolymer (COC) | 4.94 | 4.48 | −3.20 | 5.80 | −0.81 | −1.31 | −1.77 |
| Polystyrene | 4.93 | 4.63 | −2.25 | 4.33 | −0.96 | −1.32 | −1.62 |
| Polypropylene | 7.29 | 6.74 | −2.16 | 8.04 | 1.61 | 1.04 | 0.49 |
| Polyethylene | 4.99 | 4.44 | −4.35 | 6.66 | −0.67 | −1.26 | −1.81 |
| Polyamide-6,6 | 11.36 | 11.70 | 6.86 | −1.94 | 4.78 | 5.11 | 5.45 |
| Polyvinylbutyral | 9.80 | 9.85 | 3.25 | −3.05 | 3.54 | 3.55 | 3.60 |
| Polyvinylpyrrolidone | 20.99 | 21.20 | 15.33 | 4.42 | 14.53 | 14.74 | 14.95 |
| PVOH | 17.39 | 17.72 | 12.61 | 2.59 | 10.82 | 11.14 | 11.47 |
| Polyglycolic Acid | 6.13 | 6.43 | 1.87 | −0.60 | −0.39 | −0.12 | 0.18 |
| Poly(ethylene acrylic acid) | 9.08 | 9.32 | 3.97 | −3.83 | 2.61 | 2.83 | 3.07 |
| Poly(methacrylic acid) | 7.03 | 7.06 | 0.66 | −0.51 | 0.81 | 0.78 | 0.81 |
| Cellophane | 28.50 | 28.81 | 23.51 | 13.01 | 21.93 | 22.25 | 22.56 |

TABLE 5

Selected thermal and crystallinity properties for PVOH (0 mol % ethylene), LDPE (100 mol % ethylene), and selected EVOH (ethylene vinyl alcohol) copolymers[4]

| EVALCA Resin Grade | EVOH E171 | EVOH F171 | EVOH G176 | PVOH | LDPE | |
|---|---|---|---|---|---|---|
| $T_{m,peak}$ (° C.) | 162.43 | 182.04 | 154.79 | 230 | 110 | |
| $T_m$ (° C.) | 157.97 | 176.29 | 149.87 | — | — | |
| DH (J/g) | 67.55 | 70.46 | 61.09 | — | — | |
| Mass Crystallinity (wt. %) | 23.1 | 24.0 | 20.8 | 38 | 35 | |
| Ethylene (mol %) | 44 | 32 | 48 | 0 | 100 | |
| VOH (mol %) | 56 | 68 | 52 | 100 | 0 | |
| Ethylene (wt. %) | 0.333 | 0.231 | 0.370 | 0.000 | 1.000 | |
| VOH (wt. %) | 0.667 | 0.769 | 0.630 | 1.000 | 0.000 | |
| $T_g$ (° C.) | 50 | 63 | 45 | 85 | −32 | |
| $T_g$ (K) | 323.5 | 336.5 | 318.5 | 358.5 | 241.5 | |
| $T_{g,Fox}$ (° C.)[B] | 35 | 49 | 31 | 85 | −32 | |
| $T_{g,Kwei}$ (° C.)[C] | 50 | 61 | 46 | 85 | −32 | |
| e[2] | 0.02 | 2.39 | 1.06 | 0.19 | 0.00 | Total 3.66 |
| Calculated $T_m$ (° C.) | 164.65 | 179.92 | 159.90 | 230.00 | 110.00 | |

[A] MW: ethylene, 28.05 g/mol; VOH, 44.053

[B] $T_{g,Fox}$ (° C.): $\frac{1}{T_g} = \frac{w_1}{T_{g,1}} + \frac{w_2}{T_{g,2}}$.

[C] Kwei Model Parameters: k, 0.999; p, 17.58.

$T_{g,Kwei}$ (° C.): $T_g = \frac{(W_1 T_{g1} + W_2 T_{g2})}{(W_1 + kW_2)} + pW_1 W_2$ Analysis of this data based on the principles of this disclosure indicate that compositions that balance good heating performance and good flavor scalping performance may be realized in the range of ethylene content between about 40 mol % and 80 mol %. See, Table 5 and FIG. 2. Commercially-known EVOH co-polymers with the highest ethylene content contain about 48 mol % ethylene. Therefore, it has been discovered that EVOH co-polymers having higher ethylene content that this, and up to about 80 mol %, are suitable for the balanced and improved heating performance and flavor scalping performance. That is, this disclosure provides for heat sealing layer polymers to be, to comprise, or to be selected from an EVOH co-polymer in which about 40≤mol % ethylene≤about 80%.

In addition, analysis of this data according to the principles of this disclosure further indicate that, in order to achieve a sealant layer composition balancing high chemical polarity with low crystallinity to ensure good heat sealing performance, a blend of an ethylene-based heat sealant resins with the EVOH can be provided, which give an effective ethylene mole percentage within the range of from about 1 mol % to about 90 mol %, but generally within the range between about 40 mol % and about 80 mol %, can be utilized. For example, the EVOH can be blended with one or more of the following ethylene-based homopolymers and/or copolymers to provide the disclosed blend of an ethylene-based heat sealant resins with the EVOH: LDPE; HDPE; LLDPE; VLDPE; ULDPE; ethylene copolymers with vinyl acetate; ethylene copolymers with methyl-, ethyl-, or butyl-acrylate; ethylene-acid copolymers with acrylic acid, methacrylic acid and partially or completely neutralized ionomers thereof; maleic anhydride-grafted ethylene copolymers; glycidyl methacrylate or epoxy modified ethylene copolymers; or any other ethylene-based copolymer(s) possessing a hydroxyl-reactive functionality, and the like.

Polymer blends such as disclosed immediately above yield the sealant layer compositions that achieve the requisite balance of both good heat sealability properties with low flavor scalping properties, according to the principles set out in this disclosure. That is, this disclosure provides for heat sealing layer polymers to be, to comprise, or to be selected from a blend of an EVOH copolymer and PE (polyethylene) blend in which the total ethylene content in the blend is from about 1 mol % to about 90 mol %. Advantageouslyh, the EVOH copolymer and PE blend can have a total ethylene content of about 40≤mol % ethylene≤about 80%. In this composition range, it is also possible to include some PVOH in the blend, if desired.

Therefore, this disclosure provides for a laminate packaging structure such as a beverage component pouch having an innermost heat sealing layer comprising at least one of: a) an EVOH (ethylene vinyl alcohol) copolymer having an ethylene content of from about 1 mol % and about 90 mol %; and/or b) an EVOH copolymer and PE (polyethylene) blend having a total ethylene content in the blend of from about 1 mol % and about 90 mol %. In further aspects, the EVOH copolymer can have have an ethylene content of from about 1 mol % and about 80 mol % and/or the EVOH copolymer and PE (polyethylene) blend can have a total ethylene content in the blend of from about 1 mol % and about 80 mol %. Moreover, in either copolymer option, the mol % of ethylene in the EVOH co-polymer or the mol % of ethylene in the EVOH/PE blend can be about 1 mol %, 2 mol %, 3 mol %, 4 mol %, 5 mol %, 6 mol %, 7 mol %, 8 mol %, 9 mol %, 10 mol %, 12 mol %, 15 mol %, 18 mol %, 20 mol %, 25 mol %, 30 mol %, 35 mol %, 40 mol %, 45 mol %, 50 mol %, 55 mol %, 60 mol %, 65 mol %, 70 mol %, 75 mol %, 80 mol %, 85 mol %, or 90 mol %, or any range between any of these mole percentages.

Accordingly, other aspects provide for a laminate packaging structure such as a beverage component pouch having an innermost heat sealing layer comprising an EVOH copolymer and PE (polyethylene) blend having a total ethylene content in the blend of from about 1 mol % and about 90 mol %, from about 10 mol % and about 90 mol %, from about 20 mol % and about 85 mol %, from about 30 mol % and about 85 mol %, or from about 40 mol % and about 80 mol %. According to this aspect, the EVOH copolymer and PE (polyethylene) blend can generally have a total ethylene content in the blend of about 20 mol %, 25 mol %, 30 mol %, 35 mol %, 40 mol %, 45 mol %, 50 mol %, 55 mol %, 60 mol %, 65 mol %, 70 mol %, 75 mol %, or 80 mol %.

In a further aspect, this disclosure provides for a process for heat-sealing two thermoplastics wherein the two thermoplastic surfaces are sealed to one another by the application of heat and pressure, wherein the improvement comprises at least one of the thermoplastics comprises an EVOH (ethylene vinyl alcohol) copolymer having an ethylene content of from about 1 mol % to about 90 mol %; and/or an EVOH copolymer and PE (polyethylene) blend in which the total ethylene content in the blend is from about 1 mol % to about 90 mol %.

According to yet another aspect, the disclosure also provides an article wherein two thermoplastic surfaces have been heat-sealed, wherein at least one of the thermoplastic surfaces comprises an EVOH (ethylene vinyl alcohol) copolymer having an ethylene content of from about 1 mol % to about 90 mol %; and/or an EVOH copolymer and PE (polyethylene) blend in which the total ethylene content in the blend is from about 1 mol % to about 90 mol %.

In an aspect, the strategy for the current disclosure can utilize the addition of a polyolefin-based sealant resin as a minor component blended and homogenized with EVOH to provide a sealant layer with improved heat sealing performance. This approach has been found to unexpectedly maintain the excellent flavor scalping resistance of EVOH for a wide range of flavor components of varying polarities. Prior to this disclosure, there have been few attempts to address a potential laminate sealant composition that is both heat sealable and non-flavor scalping. While not bound by theory, this result may be due to the observation that these features are generally mutually exclusive. That is, most polymers that are resistant to flavor scalping are generally quite difficult to heat seal.

Accordingly, this disclosure is directed generally toward the stabilization of polymer blend morphologies in immiscible or partially miscible polymer blends comprising the food contact and heat sealing layer of the laminate structure. The following summary of various aspects of the disclosure pertain to the composition and blending sequence for the sealant layer formulation with respect to the following general guidelines.

(1) The composition for the heat sealant-food contact layer of the laminate structure may comprise as a first component an EVOH copolymer with an ethylene content in the range of from 1 mole percent to 80 mole percent, or alternatively, in the range of from 1 mole percent to 90 mole percent, admixed with at least one polyolefin polymer or copolymer composition, containing at least one interfacial compatibilizing agent.

(2) The EVOH copolymer may comprise from at least 10 volume percent to at most 99 volume percent of the heat sealant-food contact layer.

(3) The polyolefin composition may comprise one or more polymers from the following list: high density polyethylene (HDPE), linear low density (LLDPE), very-low density (VLDPE) or ultra-low density (ULDPE) polyethylene copolymers catalyzed by a various heterogeneous and homogeneous transition metal coordination catalyst technologies; high-pressure, free radical polymerized ethylene homopolymers (LDPE); high-pressure, free-radical polymerized copolymers of ethylene with vinyl acetate, acrylates (e.g. methyl-, ethyl-, and/or butyl-acrylates), acid comonomers (e.g. acrylic acid, and methacrylic acid); and partially-neutralized or neutralized ionomers of ethylene-acid copolymers; and various blend of the preceding polymers.

(4) The compatibilizing agent may comprise, may consist essentially of, or may be selected from the group consisting of: (a) one of the polyolefin resins listed in guideline (3) above; an anhydride-grafted variant of one of the preceding polyolefin resins listed in guideline (3) above; an epoxy-modified (glycidyl) resin capable of reactively engaging EVOH hydroxyl functionality (e.g. glycidyl methacrylate-modified resins); and/or any resin with a reactive functionality capable of reaction with hydroxyl functionality.

(5) The compounding/blending sequence for the heat sealant-food contact layer generally proceeds as follows:
  (a) The compounding of one or more of the polyolefin resins listed in guideline (3) above with a suitable compatibilizing agent as described in guideline (4) above.
  (b) The compounding of the preceding masterbatch with the EVOH copolymer defined in guideline (1) above.

(6) Laminate coextrusion of the compounded resin in (5)(b) as a sealant layer, with or without a tie layer adhesive.

(7) Extrusion coating of the compounded resin in (5)(b) as a sealant layer, with or without a tie layer adhesive.

(8) Suitable tie layer adhesives may comprise, may consist essentially of, or may be selected from the group consisting of, but are not limited to, ethylene-vinyl acetate copolymers, ethylene-acrylate copolymers, ethylene-acid copolymers, and glycidyl methacrylate-modified ethylene copolymers.

The EVOH and ethylene-based homopolymer or copolymer blend with the hydroxyl-reactive compatibilizing agent can connect the EVOH phase with the ethylene copolymer blend-based phase across the interface. This connecting or compatibilizing function strengthens the interface so that the blended layer is pervasively integrated and strong and also provides heat sealable ethylene-copolymer domains at the film surface which can self-interdiffuse to yield improved heat seal strengths. Accordingly, the reactive compatibilizing polymer is generally added to the ethylene-based homopolymer or copolymer blended layer only.

These and other aspects and embodiments of the invention can be further described in the following examples.

EXAMPLES

In accordance with the strategies set out in this disclosure, Table 6 summarizes several exemplary blends which illustrate the concept over a range of compositions. The list provided in this table by no means is inclusive of all possible embodiments or even most embodiments, but these examples illustrate the salient features of the concept sealant layer composition and formulation strategy.

TABLE 6

Experimental scheme for validating the invention concept

| Blend | Major Component | Minor Component | Interfacial Compatiblizer |
|---|---|---|---|
| 1 | EVOH | HDPE | HDPE-g-MAH |
| 2 | EVOH | LLDPE | LLDPE-g-MAH |
| 3 | EVOH | HDPE/EAA | HDPE-g-MAH |
| 4 | EVOH | LLDPE/EAA | LLDPE-g-MAH |
| 5 | EVOH | met-LLDPE | LLDPE-g-MAH |
| 6 | EVOH | HDPE/EAA/EAA Ionomer | HDPE-g-MAH |
| 7 | EVOH | LLDPE/EAA/EAA Ionomer | LLDPE-g-MAH |

[A]Abbreviations: EVOH (ethylene vinyl alcohol copolymer); HDPE (high density polyethylene); LLDPE (linear low density polyethylene); met-LLDPE (metallized linear low density polyethylene, typically comprising a thin layer of aluminum deposited on the polyethylene surface); EAA (ethylene acrylic acid); g-MAH (maleic anhydride grafted polymer).

For example, in the Examples presented herein and generally in all cases, an EVOH copolymer comprising an ethylene content in the range of 1 mol % to 90 mol % or more can be blended directly or sequentially with the polyolefin minor phase and reactive compatiblizer, or with a compounded polyolefin masterbatch comprising a polyolefin-based minor component and a reactive (covalently bonded or though relatively strong intermolecular attraction), interfacial compatibilizing polymer to yield a multi-phase polymer blend with volume-based compositions of $50.1\% \leq \phi_{major} \leq 99.5\%$ and $0.5\% \leq \phi_{minor} \leq 49.9\%$.

The composition of the blend also could be equivalently specified in weight percentages base upon using appropriate mass phase densities for each component. In this aspect, the volume fraction of the minor phase integrates the minor polyolefin component and the reactive interfacial compatibilizing polymer. The addition of the interfacial compatibilizing polymer generally can be added at a mass fraction between 0.01 wt % and 100 wt % of the minor phase polyolefin blend. The actual composition of the interfacial compatibilizing polymer generally depends upon its concentration of reactive functionality, its molecular weight and molecular weight distribution, and the intensities of masterbatch and final blend mixing employed, among other variables.

In one aspect, and while Applicant does not intend to be bound by theory, the polyolefin minor phase of the blend may act as a type of reservoir for storage the interfacial compatibilizing polymer while at the same time limiting its exposure to the EVOH phase in a controlled manner. In this aspect, sufficient reactive compatibilizing polymer may be provided to react and bridge the EVOH phase, while anchoring the minor polyolefin phase. Accordingly, too much reactive compatibilizing polymer within the EVOH phase may lead to excessive crosslinking which would impede flow and caulking during the heat sealing process.

According to further aspects, the interfacial compatibilizing polymer desirably can include some measure of reactive functionality that can react with the EVOH hydroxyl functionality. Applicable reactive chemical functionalities include such groups as anhydride, epoxy (glycidyl), and the like that are capable of creating a covalent bond across the EVOH-polyolefin minor phase interface. However, these are exemplary chemical functionalities, because it is not necessary that interfacial bonding be covalent, as adequate interface stabilization and strengthening may be achieved by compatibilizing polymers that operate through different specific interactions such as hydrogen bonding, ionic interactions, polar interactions, dispersion forces, and the like. Such polymers can include olefin-vinyl acid copolymers and related ionomers, for example.

As disclosed herein, the polyolefin composition may comprise or may be selected from one or more of the following polymers: high density polyethylene (HDPE), linear low density (LLDPE), very-low density (VLDPE) or ultra-low density (ULDPE) polyethylene copolymers catalyzed by a various heterogeneous and homogeneous transition metal coordination catalyst technologies; high-pressure, free radical polymerized ethylene homopolymers (LDPE); high-pressure, free-radical polymerized copolymers of ethylene with vinyl acetate, acrylates (e.g. methyl-, ethyl-, and/or butyl-acrylates), acid comonomers (e.g. acrylic acid, and methacrylic acid); and partially-neutralized or neutralized ionomers of ethylene-acid copolymers; and various blend of the preceding polymers.

Examples of blend strategies pursuant to Item (3) polyolefin compositions described above include:
(1) LDPE, HDPE, LLDPE, or VLDPE with Ethylene-Acid Copolymer: Add EVA or EMA copolymer as interfacial compatibilizers, and
(2) LDPE, HDPE, LLDPE, or VLDPE with Sodium Ionomer: Add EVA or EMA with Ethylene-Acid copolymer as interfacial compatibilizers.
(3) Items (1) and (2) above would also include at least one interfacial reactive compatibilizing agent capable of reacting with EVOH hydroxyl functionality.

Polymer blends are designed using copolymers in which the neighboring units in the copolymer have a lower affinity for each other than the units composing another polymer or copolymer. If the interaction energy between the copolymer units is more positive than for the interactions in the blended polymer, then the overall interaction energy will be lowered and partial miscibility may occur. Specific interactions such as hydrogen bonding may be effectively used in polymer blends to drive interfacial compatibility and partial miscibility between phases.

Definitions

To define more clearly the terms used herein, the following definitions are provided to further explain and elaborate various aspects of this disclosure, which are applicable herein unless otherwise indicated by the disclosure itself or the context. To the extent that any definition or usage provided by any document incorporated herein by reference conflicts with the definition or usage provided herein, the definition or usage provided herein controls.

The term "carbonated soft drink (CSD)" bottles or container is used herein to refer to the containers of this disclosure that are designed for use under pressure, such as carbonation, without specific limitation as to the intended contents of the container. Generally, the term "container" is used interchangeably with the term "bottle" unless the context requires otherwise.

A polymer "blend" or a blend of polymers and/or copolymers constitutes an art-recognized class of materials based on the listed polymers. According to the *IUPAC Compendium of Chemical Terminology* (ed. A. D. McNaught & A. Wilkinson, Blackwell Science, Cambridge, UK, c. 1997, p. 312), a polymer blend is a macroscopically homogeneous mixture of two or more different species of polymers. Polymer blends have a homogeneous nature and well-defined properties.

The abbreviation "PVOH" is used for poly(vinyl alcohol) which has at 0 mol % ethylene content; "LDPE" is used for low density polyethylene which has 100 mol % ethylene content; and "EVOH" is an ethylene vinyl alcohol copolymer, which is nominally a co-polymer of vinyl alcohol and ethylene, and contains an ethylene content greater than 0 mol % and less than 100 mol %.

As used in the specification and the appended claims, the singular forms "a," "an," and "the" include plural referents, unless the context clearly dictates otherwise. Thus, for example, reference to "a light" includes a single light as well as any combination of more than one light if the contact indicates or allows, such as multiple UV lights that are used in combination.

Throughout the specification and claims, the word "comprise" and variations of the word, such as "comprising" and "comprises," means "including but not limited to," and is not intended to exclude, for example, other additives, components, elements, or steps. While compositions and methods are described in terms of "comprising" various components or steps, the compositions and methods can also "consist essentially of" or "consist of" the various components or steps.

Reference throughout this specification to "one embodiment," "an embodiment," or "embodiments" means that a particular feature, structure, or characteristic described in connection with the embodiment is included in at least one embodiment. Thus, the appearances of the phrases "in one embodiment" or "in an embodiment" in various places in the specification are not necessarily all referring to the same embodiment. Furthermore, the particular features, aspects, structures, or characteristics may be combined in any suitable manner in one or more embodiments.

"Optional" or "optionally" means that the subsequently described element, component, step, or circumstance can or cannot occur, and that the description includes instances where the element, component, step, or circumstance occurs and instances where it does not.

Throughout this specification, various publications may be referenced. The disclosures of these publications are hereby incorporated by reference in pertinent part, in order to more fully describe the state of the art to which the disclosed subject matter pertains. The references disclosed are also individually and specifically incorporated by reference herein for the material contained in them that is discussed in the sentence in which the reference is relied upon. To the extent that any definition or usage provided by any document incorporated herein by reference conflicts with the definition or usage applied herein, the definition or usage applied herein controls.

Unless indicated otherwise, when a range of any type is disclosed or claimed, for example a range of the sizes, number, percentages, and the like, it is intended to disclose or claim individually each possible number that such a range could reasonably encompass, including any sub-ranges or combinations of sub-ranges encompassed therein. When describing a range of measurements such as sizes or percentages, every possible number that such a range could reasonably encompass can, for example, refer to values within the range with one significant figure more than is present in the end points of a range, or refer to values within the range with the same number of significant figures as the end point with the most significant figures, as the context indicates or permits. For example, when describing a range of percentages such as from 85% to 95%, it is understood that this disclosure is intended to encompass each of 85%, 86%, 87%, 88%, 89%, 90%, 91%, 92%, 93%, 94%, and 95%, as well as any ranges, sub-ranges, and combinations of sub-ranges encompassed therein. Applicants' intent is that these two methods of describing the range are interchangeable. Accordingly, Applicants reserve the right to proviso out or exclude any individual members of any such group, including any sub-ranges or combinations of sub-ranges within the group, if for any reason Applicants choose to claim less than the full measure of the disclosure, for example, to account for a reference that Applicants are unaware of at the time of the filing of the application.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, or ±3% of the stated value.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that are employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

Those skilled in the art will readily appreciate that many modifications are possible in the exemplary embodiments disclosed herein without materially departing from the novel teachings and advantages according to this disclosure. Accordingly, all such modifications and equivalents are intended to be included within the scope of this disclosure as defined in the following claims. Therefore, it is to be understood that resort can be had to various other aspects, embodiments, modifications, and equivalents thereof which, after reading the description herein, may suggest themselves to one of ordinary skill in the art without departing from the spirit of the present disclosure or the scope of the appended claims.

Applicants reserve the right to proviso out any selection, feature, range, element, or aspect, for example, to limit the scope of any claim to account for a prior disclosure of which Applicants may be unaware.

What is claimed is:

1. A laminate packaging structure, the structure comprising:
   a) an innermost heat sealing layer comprising at least one of:
      i) an EVOH (ethylene vinyl alcohol) copolymer having an ethylene content of from about 75 mol % to about 90 mol %; or
      ii) an EVOH copolymer and PE (polyethylene) blend in which the total ethylene content in the blend is from about 85 mol % to about 90 mol %.

2. A laminate packaging structure according to claim 1, wherein the PE (polyethylene) comprises one or more of the following polymers: high density polyethylene (HDPE); linear low density polyethylene (LLDPE); very-low density polyethylene copolymers (VLDPE); ultra-low density (ULDPE) polyethylene copolymers; high-pressure, free radical polymerized ethylene homopolymers (LDPE); high-pressure, free-radical polymerized copolymers of ethylene with vinyl acetate, acrylates (methyl-, ethyl-, and/or butyl-acrylates), or acid comonomers (acrylic acid and/or methacrylic acid); and/or partially-neutralized or neutralized ionomers of ethylene-acid copolymers.

3. A laminate packaging structure according to claim 1, wherein the EVOH copolymer and PE (polyethylene) blend further comprises a compatibilizing agent comprising:
   i) one of the polyolefin resins according to claim 2;
   ii) an anhydride-grafted variant of one polyolefin resins according to claim 2;
   iii) an epoxy-modified (glycidyl) resin capable of reactively engaging EVOH hydroxyl functionality; and/or
   iv) glycidyl methacrylate-modified resins.

4. A laminate packaging structure according to claim 1, wherein the innermost heat sealing layer comprises an EVOH (ethylene vinyl alcohol) copolymer having an ethylene content of from about 80 mol % to about 90 mol %.

5. A laminate packaging structure according to claim 1, wherein the innermost heat sealing layer comprises an EVOH (ethylene vinyl alcohol) copolymer having an ethylene content of from about 85 mol % to about 90 mol %.

6. A laminate packaging structure according to claim 1, further comprising:
   b) optionally, at least one polymer barrier layer compatible with and adjacent the innermost heat sealing layer; and
   c) an outermost polymer layer compatible with and adjacent the at least one optional barrier layer when present, or compatible with and adjacent the innermost heat sealing layer when the at least one optional barrier layer is absent.

7. A laminate packaging structure according to claim 6, wherein at least one of the optional polymer barrier layer(s) and/or the outermost polymer layer comprises PET (polyethylene terephthalate polymer or co-polymer), PET-Ox (inorganic oxide coated PET polymer or co-polymer), PE (polyethylene-based polymer or copolymer), BOPA (biaxially-oriented polyamide), EVOH (ethylene vinyl alcohol copolymer), PA (polyamide), or a tie layer.

8. A beverage component pouch comprising the laminate packaging structure according to claim 1.

9. A method of reducing flavor scalping in a barrier laminate packaging structure for beverage component pouches, the method comprising:
   a) providing a beverage component pouch having an innermost heat sealing layer comprising at least one of:
      i) an EVOH (ethylene vinyl alcohol) copolymer having an ethylene content of from about 75 mol % to about 90 mol %; and/or
      ii) an EVOH copolymer and PE (polyethylene) blend in which the total ethylene content in the blend of from about 85 mol % to about 90 mol %; and
   b) storing a beverage component in the beverage component pouch for a period of time.

10. A method of reducing flavor scalping according to claim 9, wherein the beverage component pouch is a co-extruded laminate packaging structure comprising the innermost heat sealing layer, and further comprising:
    b) at least one optional polymer barrier layer compatible with and adjacent the innermost heat sealing layer; and/or
    c) an outermost polymer layer compatible with and adjacent the at least one optional barrier layer when present, or compatible with and adjacent the innermost heat sealing layer when the at least one optional barrier layer is absent.

11. A method of reducing flavor scalping according to claim 9, wherein at least one of the optional polymer barrier layer(s) and/or the outermost polymer layer comprises PET (polyethylene terephthalate polymer or co-polymer), PET-Ox (inorganic oxide coated PET polymer or co-polymer), PE (polyethylene-based polymer or copolymer), BOPA (biaxially-oriented polyamide), EVOH (ethylene vinyl alcohol copolymer), PA (polyamide), or a tie layer.

12. A method of reducing flavor scalping according to claim 9, wherein the laminate packaging structure comprises two or more polymer barrier layers.

13. A method of reducing flavor scalping according to claim 9, wherein the laminate packaging structure comprises three or more polymer barrier layers.

14. A method of reducing flavor scalping according to claim 9, wherein the innermost heat sealing layer comprises an EVOH (ethylene vinyl alcohol) copolymer having an ethylene content of from about 80 mol % to about 90 mol %.

15. A method of reducing flavor scalping according to claim 9, wherein the PE (polyethylene) comprises one or more of the following polymers: high density polyethylene (HDPE); linear low density polyethylene (LLDPE); very-low density polyethylene copolymers (VLDPE); ultra-low density (ULDPE) polyethylene copolymers; high-pressure, free radical polymerized ethylene homopolymers (LDPE); high-pressure, free-radical polymerized copolymers of ethylene with vinyl acetate, acrylates (methyl-, ethyl-, and/or butyl-acrylates), acid comonomers (acrylic acid and/or methacrylic acid); and partially-neutralized or neutralized ionomers of ethylene-acid copolymers.

16. A method of reducing flavor scalping according to claim 9, wherein the EVOH copolymer and PE (polyethylene) blend further comprises a compatibilizing agent comprising:
    i) one of the polyolefin resins according to claim 2;
    ii) an anhydride-grafted variant of one polyolefin resins according to claim 2;

iii) an epoxy-modified (glycidyl) resin capable of reactively engaging EVOH hydroxyl functionality; and/or iv) glycidyl methacrylate-modified resins.

17. A method for producing a heat-sealable laminate packaging structure film, comprising the step of co-extruding:
   a) an innermost heat sealing layer comprising at least one of:
      an EVOH (ethylene vinyl alcohol) copolymer having an ethylene content of from about 75 mol % to about 90 mol %; and/or
      an EVOH copolymer and PE (polyethylene) blend in which the total ethylene content in the blend is from about 85 mol % to about 90 mol %;
   b) optionally, at least one polymer barrier layer compatible with and adjacent the innermost heat sealing layer; and
   c) an outermost polymer layer compatible with and adjacent the at least one optional barrier layer when present, or compatible with and adjacent the innermost heat sealing layer when the at least one optional barrier layer is absent.

18. A packaged beverage component comprising:
   a) a beverage component pouch comprising a laminate packaging structure according to claim 1; and
   b) a beverage base, a beverage component, or a beverage component concentrate.

\* \* \* \* \*